United States Patent [19]

Nardi

[11] Patent Number: 4,992,343

[45] Date of Patent: Feb. 12, 1991

[54] LEAD-CONTAINING ANODE CURRENT COLLECTOR FOR ALKALINE CELLS

[75] Inventor: John C. Nardi, Brunswick, Ohio

[73] Assignee: Eveready Battery Company, Inc., St. Louis, Mo.

[21] Appl. No.: 395,235

[22] Filed: Aug. 17, 1989

[51] Int. Cl.$^5$ .................... H01M 2/32; H01M 4/66
[52] U.S. Cl. .................................. 429/57; 429/165; 429/206; 429/224
[58] Field of Search ............ 429/57, 59, 206, 165, 429/245, 224, 225; 420/469, 477, 491, 513, 521, 563, 573, 574

[56] References Cited

U.S. PATENT DOCUMENTS 4,195,120  3/1980  Rossler et al. ................... 429/50
4,791,036  12/1988  Schrenk et al. ................. 429/178

FOREIGN PATENT DOCUMENTS 50-2134    1/1975  Japan.
8382598    1/1975  Japan.
83182022   1/1975  Japan.
50-101832  8/1975  Japan.
61-61365   3/1986  Japan.
63-37567   2/1988  Japan.
63-195958  8/1988  Japan.
64-59769   3/1989  Japan.

*Primary Examiner*—Anthony Skapars
*Attorney, Agent, or Firm*—Robert W. Welsh

[57] ABSTRACT

The invention relates to an alkaline cell that uses a lead-containing conductive anode current collector alloy, such as a copper-zinc-lead alloy current collector to effectively reduce gassing at the surface of the anode current collector during storage.

13 Claims, No Drawings

LEAD-CONTAINING ANODE CURRENT COLLECTOR FOR ALKALINE CELLS

FIELD OF THE INVENTION

The invention relates to an alkaline cell employing an anode such as zinc and wherein the anode current collector used with the anode is made of a homogeneous conductive material containing a discontinuous dispersion of lead to effectively reduce gassing in the cell during storage.

BACKGROUND OF THE INVENTION

Manufacturers of primary alkaline batteries have long recognized the existence of internal gassing that occurs prior to discharging a cell. This phenomenon, commonly referred to as "shelf gassing," may pressurize a cell such that the flat bottom of a cylindrical battery becomes bulged. One problem created by severely bulged cell bottoms is that the cell may be too long to fit into a battery compartment that is located within a battery operated device. In severe cases, the pressure buildup may activate the cell's safety vent. Electrolyte expelled through the vent can injure people and/or damage the device in which the cell has been placed.

Several methods have been used to minimize the shelf gassing problem. First, the best known method relies upon amalgamation of the anode's zinc surface. This action raises the hydrogen evolution overvoltage on the zinc's surface. As the overvoltage increases, the rate of hydrogen gas generation is restricted. Second, a variety of organic compounds have been used to coat the surface of the zinc. Representative examples of organic corrosion inhibitors can be found in U.S. Pat. No. 3,847,669, or U.S. Pat. No. 4,195,120, which is directed toward the use of organic phosphate esters, or U.S. Pat. No. 4,606,984, which describes a fluorinated molecule that contains an ethoxylated polymer unit. Third, the anode's zinc particles have been altered by incorporating minor quantities of elements such as indium, lead, thallium and/or gallium into the zinc. This combination of zinc and at least one other element may take the form of a surface deposit or an alloy. Fourth, the zinc particles have been modified by heating in order to reduce the number of grain boundaries. Since the gas generating reactions are thought to occur primarily at the grain boundaries, the quantity of gas generated may be reduced as the number of grain boundaries per particle of zinc is reduced. While all of these gassing inhibitors have been claimed to be effective at reducing cell gassing, none of the inhibitors have effectively demonstrated the ability to limit gassing to a very low level in a mercury free cell or in a cell that contains very little mercury.

Japanese Patent Application No. 64-59769 discloses an alkaline cell employing a zinc anode and an anode current collector composed of a copper base alloy containing lead and/or tin.

In alkaline batteries employing conventional type brass anode current collectors, internal gassing is still a major problem. Conventional type brass employed as an anode current collector has a composition of about 65% to 70% copper and about 30% to 35% zinc. With the elimination of mercury in the battery, internal gassing is even more of a problem since it can cause the housing of the battery to expand, i.e., bulged cell bottom, even when using corrosion inhibitors.

It is an object of the present invention to provide an electrochemical cell with an anode such as zinc having little or effectively no internal gassing during storage.

It is another object of the present invention to provide a mercury free alkaline electrochemical cell with a zinc anode having little or effectively no internal gassing during storage.

It is another object of the present invention to provide a mercury free alkaline electrochemical cell with a zinc anode and a conductive anode current collector comprising an alloy containing a homogeneous dispersion of lead and wherein said cell has little or effectively no internal gassing during storage.

It is another object of the present invention to provide a mercury free alkaline electrochemical cell with a zinc anode and a conductive anode current collector comprising an alloy containing a discontinuous dispersion of lead with cadmium and/or indium and wherein said cell has little or effectively no internal gassing during storage.

It is another object of the present invention to provide a mercury free alkaline electrochemical cell with a zinc anode and a copper-zinc-lead alloy anode current collector and wherein said cell has little or effectively no internal gassing during storage.

SUMMARY OF THE INVENTION

The invention relates to an electrochemical cell comprising an anode such as zinc, a cathode, an alkaline electrolyte, and a conductive anode current collector comprising an alloy containing a discontinuous dispersion of lead in which the amount of lead contained in the alloy of the anode current collector is at least 500 parts per million based on the weight of said anode current collector and for copper-zinc-lead alloys, the amount of lead is preferably at least 900 parts per million. The term discontinuous dispersion means that the lead is dispersed in the alloy and the lead contained on the surface of the anode current collector does not form a continuous layer of lead but forms separate areas of lead on the surface.

Cylindrical alkaline cells are generally manufactured with a zinc anode, a manganese dioxide cathode and an alkaline electrolyte. The manganese dioxide is generally pressed up against the inner wall of the cylindrical container and a suitable separator material is fitted in the cavity. A mixture comprising zinc is placed in the interior of the separator and then an anode current collector is placed into the zinc mixture. The anode could be pressed powder as well as zinc in a powdered form distributed throughout an electrolyte gel.

Common choices for the anode current collector are steel, copper, zinc and brass with the most common choice being brass. The typical brass anode current collector has a composition of about 65% to 70% copper and about 30% to 35% zinc. However, in mercury free alkaline cells or alkaline cells containing a very low amount of mercury, the use of a conventional brass anode current collector has been found to contribute to the internal gassing of the cell during storage and prior to and after partial and complete discharge. It has been discovered that gassing at the surface of a conventional brass current collector can be effectively reduced by replacing the conventional brass with an anode current collector made of a conductive alloy containing a discontinuous dispersion of a minimum amount of lead. An example of such an alloy is a copper zinc lead alloy. The minimum amount of lead dispersed in the conductive anode collector made of a copper zinc lead alloy should be preferably at least 900 parts per million based on the weight of the alloy of the current collector. Preferably, the dispersed lead in a current collector made of an alloy should be from 1000 parts per million to 45,000 parts per million, and more preferably from 2500 parts per million to 30,000 parts per million based on the weight of the alloy of the anode current collector. For alloys other than copper-zinc-lead alloys, the effective amount of lead dispersed in the alloy could be 500 parts per million based on the weight of the alloy.

The lead may preferably be homogeneously dispersed throughout the anode current collector or could contain a higher or lower concentration of lead near the outer portion of the anode current collector as long as the lead contained at the outer portion of the anode current collector is within the range specified above.

In a copper-zinc-lead alloy current collector, the copper is required to provide adequate conductivity for the current collector while the zinc will be compatible with the zinc anode. Preferably, the copper should comprise at least 50 weight percent of the copper-zinc-lead alloy with the remainder substantially zinc and a minor amount of lead. More preferably, the alloy should have a composition of copper from 60 to 75 weight percent, zinc from 40 to 25 weight percent, and a minor amount of lead. A preferred copper-zinc-lead alloy for use as the anode current collector would be copper alloy C33000 containing from 65 to 68 weight percent copper, 0.25 to 0.7 weight percent lead, 0.07 weight percent iron and the remainder zinc.

In addition to a copper-zinc-lead alloy, any conductive material compatible with the electrochemical system of the cell could be used as the alloy material of the anode current collector. Thus the anode current collector could be a conductive alloy composed of steel, copper, zinc or brass containing a dispersion of lead throughout the alloy.

It has also been discovered that the gassing can be further reduced by adding a minor amount of cadmium to the alloy of the anode current collector. The cadmium can be dispersed along with the lead throughout the anode current collector. The cadmium could be added in an amount of at least 1000 parts per million based on the weight of the anode current collector. Preferably, the dispersed cadmium should be from 1500 parts per million to 2000 parts per million.

In addition to cadmium, indium can also be added to the anode current collector to further reduce gassing in the cell. The indium could be dispersed along with the lead throughout the anode current collector. The indium could be added in an amount of at least 40 parts per million based on the weight of the anode current collector. Preferably, the dispersed indium should be from 100 parts per million to 500 parts per million based on the weight of the anode current collector.

The effects, features and advantages of the present invention will be demonstrated in the following examples. It is to be understood that these examples are intended to be illustrative only and therefore should not be interpreted to impose any limitations on the invention as claimed.

EXAMPLE 1

"D" size cells were produced using an anode comprised of granular zinc, 0.1 percent mercury and a gelling agent; a cathode of manganese dioxide, carbon and a binder; and an electrolyte comprised of potassium hydroxide. The components of each cell were placed in a nickel plated steel container which served as both the container and as the cathode's current collector. The variable in each cell was the composition of the anode current collector which was made of a copper-zinc-lead alloy. The cells were stored at 71° C. for eight weeks and at weekly intervals the net bulge in each cell was measured. The data for an average of three (3) cells per Sample Lot were obtained and are shown in Table 1.

TABLE 1

| Cells Stored at 71° C. | | | | | |
|---|---|---|---|---|---|
| *Sample Lot 1 | | **Sample Lot 2 | | ***Sample Lot 3 | |
| Time (weeks) | Bulge (inch) | Time (weeks) | Bulge (inch) | Time (weeks) | Bulge (inch) |
| 1 | 0.012 | 1 | 0.009 | 1 | — |
| 2 | 0.015 | 2 | 0.008 | 2 | 0.007 |
| 4 | 0.018 | 4 | 0.007 | 4 | 0.005 |
| 5 | 0.025 | 5 | 0.008 | 5 | 0.005 |
| 6 | 0.026 | 6 | 0.007 | 6 | 0.006 |
| 7 | 0.028 | 7 | 0.008 | 7 | 0.007 |
| 8 | 0.029 | 8 | 0.007 | 8 | 0.005 |

*cells has an anode current collector comprising 68.5 to 71.5 weight percent copper, balance substantially zinc and 200 parts per million lead based on the weight of the current collector.
**cells did not have a current collector.
***cells have an anode current collector comprising 65 to 68 weight percent copper, balance substantially zinc and 2500 parts per million lead based on the weight of the current collector.

The data in Table 1 show that the cells of Sample Lot 2 with no current collector had very little bulge while the cells of Sample Lot 1 with the conventional brass current collector containing only 200 parts per million lead resulted in a four fold increase in the amount of bulge after eight weeks. This increase in bulge occurred even though the cell contained 0.1 percent mercury based on the weight of the zinc in the anode. The cells with the current collector containing 2500 parts per million lead (Sample Lot 3) resulted in an average bulge comparable to the average bulge in the cells without a current collector (Sample Lot 2). The data show that by increasing the quantity of lead in the alloy of the anode current collector from 200 parts per million (Sample Lot 1) to 2500 parts per million (Sample Lot 3), the gassing in the cell can be substantially reduced.

EXAMPLE 2

"D" size cells were produced as in Example 1 except that the zinc anode contained no mercury. Again, the variable in each cell was the composition of the copper zinc lead alloy anode current collector. The cells were stored at 71° C. for eight weeks and at weekly intervals the net bulge in each cell was measured. The data for an average of three (3) cells per Sample Lot were obtained and are shown in Table 2.

TABLE 2

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.054 | 1 | 0.010 |
| 2 | 0.052 | 2 | 0.019 |
| 4 | 0.050 | 4 | 0.020 |
| 5 | 0.055 | 5 | 0.022 |
| 6 | 0.055 | 6 | 0.028 |
| 7 | 0.056 | 7 | 0.027 |

TABLE 2-continued

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 8 | 0.057 | 8 | 0.027 |

*cells had an anode current collector comprising 68.5 to 71.5 weight percent copper, balance substantially zinc and 200 parts per million lead based on the weight of the current collector.
**cells had an anode current collector comprising 65 to 68 weight percent copper, balance substantially zinc and 2500 parts per million lead based on the weight of the current collector.

The data in Table 2 show that in mercury free cells, the cells containing a copper zinc lead alloy current collector with only 200 parts per million lead (Sample Lot 1), bulged an average of approximately 0.057 inch after storage for eight weeks at 71° C. When the lead content in the copper-zinc-lead alloy was increased to 2500 parts per million (Sample Lot 2), the average bulge in the cells after eight weeks was only 0.027 inch. Thus, in mercury free alkaline cells, the gassing caused by the current collector can be decreased by increasing the quantity of lead in the current collector in accordance with this invention.

EXAMPLE 3

"D" size cells were produced as in Example 1 except that the zinc anode contained no mercury. Again, the variable in each cell was the composition of the copper-zinc-lead alloy anode current collector. The cells were stored at 71° C. and at weekly intervals the net bulge in each cell was measured. The data for an average of three cells per Sample Lot were obtained and are shown in Table 3.

TABLE 3

| Cells Stored at 71° C. | | | | | |
|---|---|---|---|---|---|
| *Sample Lot 1 | | **Sample Lot 2 | | ***Sample Lot 3 | |
| Time (weeks) | Bulge (inch) | Time (weeks) | Bulge (inch) | Time (weeks) | Bulge (inch) |
| 1 | 0.042 | 1 | 0.012 | 1 | 0.005 |
| 2 | 0.041 | 2 | 0.014 | 2 | 0.004 |
| 3 | 0.038 | 3 | 0.020 | 3 | 0.003 |
| 4 | 0.040 | 4 | 0.021 | 4 | 0.003 |
| 5 | 0.035 | 5 | 0.020 | 5 | 0.005 |
| 6 | 0.036 | 6 | 0.017 | 6 | 0.005 |
| 7 | 0.040 | 7 | 0.018 | 7 | 0.004 |

*cells had an anode current collector comprising 68.5 to 71.5 weight percent copper, balance substantially zinc and 200 parts per million of lead based on the weight of the current collector.
**cells had an anode current collector comprising 65 to 68 weight percent copper, balance substantially zinc and 2500 parts per million lead based on the weight of the current collector.
***cells had an anode current collector comprising 60 to 63 weight percent copper, balance substantially zinc and 25,000 parts per million lead based on the weight of the current collector.

The data in Table 3 show that in memory free alkaline cells, the average bulge in the cells containing only 200 parts per million lead (Sample Lot 1) in the anode current collector had an average bulge of approximately 0.040 inch after storage at 71° C. for seven weeks while similar cells having 2500 parts per million lead (Sample Lot 2) in the anode current collector had an average bulge of only 0.018 inch. In the cells containing 25,000 parts per million lead in the anode current collector (Sample Lot 3), the average bulge in the cell was only 0.004 inch after seven weeks. This data show that in mercury free cells, increasing the lead level in the anode current collector has a direct and significant impact on reducing the quantity of gas evolved as determined by measuring the bulge in the bottom of the cell.

EXAMPLE 4

"D" size cells were produced as in Example 1 except that the zinc anode in each cell contained no mercury but did contain a small amount of lead with Sample Lot 2 containing a larger amount of lead in the zinc anode. In addition, the composition of the copper zinc-lead alloy anode current collector was different for each cell. The cells were stored for eight weeks at 71° C. and at weekly intervals the average net bulge for three (3) cells in each Sample Lot were measured. The data for an average of three cells per Sample Lot were obtained and are shown in Table 4.

TABLE 4

| Cells Stored at 71° C. | | | | | |
|---|---|---|---|---|---|
| *Sample Lot 1 | | **Sample Lot 2 | | ***Sample Lot 3 | |
| Time (weeks) | Bulge (inch) | Time (weeks) | Bulge (inch) | Time (weeks) | Bulge (inch) |
| 1 | 0.037 | 1 | 0.047 | 1 | 0.051 |
| 2 | 0.037 | 2 | 0.051 | 2 | 0.053 |
| 3 | 0.037 | 3 | 0.048 | 3 | 0.053 |
| 4 | 0.037 | 4 | 0.051 | 4 | 0.052 |
| 5 | 0.038 | 5 | 0.051 | 5 | 0.052 |
| 6 | 0.037 | 6 | 0.050 | 6 | 0.050 |
| 7 | 0.037 | 7 | 0.047 | 7 | 0.048 |
| 8 | 0.036 | 8 | 0.046 | 8 | 0.048 |

*cells had an anode containing zinc with 0.05 weight percent lead and an anode current collector comprising 65 to 68 weight percent copper, balance substantially zinc and 5000 parts per million lead based on the weight of the current collector.
**cells had an anode containing zinc with 0.12 weight percent lead and an anode current collector comprising 68.5 to 71.5 weight percent copper, balance substantially zinc and 200 parts per million lead based on the weight of the current collector.
***cells had an anode containing zinc with 0.05 weight percent lead and an anode currentcollector comprising 68.5 to 71.5 weight percentcopper, balance substantially zinc and 200 partsper million lead based on the weight of thecurrent collector.

The data in Table 4 show that after eight weeks of storage at 71° C., the cells with the high lead content in the anode (Sample Lot 2) had approximately the same average bulge as the cells without the additional lead in the anode (Sample Lot Incorporating the lead into the anode current collector (Sample Lot 1) instead of the zinc anode (Sample Lot 2) resulted in a decrease of approximately 22% in the average bulge of the cells.*
The data in Table 4 show that the incorporation of lead into the anode current collector is more effective at controlling shelf gassing than is the incorporation of additional lead into the zinc anode.
* with the conventional zinc anode.

EXAMPLE 5

"D" size cells were produced as in Example 1 except that the zinc anode contained no mercury. Again, the variable in each cell was the composition of the zinc alloy anode current collector. The cells were stored at 71° C. and at weekly intervals the average net bulge for three cells in each Sample Lot was measured. The data for an average of three cells per Sample Lot were obtained and are shown in Table 5.

TABLE 5

| Cells Stored at 71° C. | | | | | | | |
|---|---|---|---|---|---|---|---|
| *Sample Lot 1 | | **Sample Lot 2 | | ***Sample Lot 3 | | ****Sample Lot 4 | |
| Time (weeks) | Bulge (inch) | Time (weeks) | Bulge (inch) | Time (weeks) | Bulge (inch) | Time (weeks) | Bulge (inch) |
| 1 | 0.041 | 1 | 0.020 | 1 | 0.026 | 1 | 0.016 |
| 2 | 0.046 | 2 | 0.022 | 2 | 0.028 | 2 | 0.016 |
| 3 | 0.045 | 3 | 0.021 | 3 | 0.026 | 3 | 0.015 |
| 4 | 0.043 | 4 | 0.021 | 4 | 0.024 | 4 | 0.015 |
| 5 | 0.041 | 5 | 0.021 | 5 | 0.024 | 5 | 0.014 |
| 6 | 0.042 | 6 | 0.021 | 6 | 0.024 | 6 | 0.015 |
| 7 | 0.040 | 7 | 0.019 | 7 | 0.021 | 7 | 0.013 |
| 8 | 0.041 | 8 | 0.019 | 8 | 0.021 | 8 | 0.015 |

*cells had an anode current collector comprising a zinc anode current collector.
**cells had an anode current collector comprising a zinc anode current collector with 1400 parts per million cadmium based on the weight of the current collector dispersed throughout the current collector.
***cells had an anode current collector comprising a zinc anode current collector with 700 parts per million lead based on the weight of the current collector dispersed throughout the current collector.
****cells had an anode current collector comprising a zinc anode current collector with 1400 parts per million cadmium based on the weight of the current collector and 700 parts per million lead based on the weight of the current collector dispersed throughout the current collector.

The data in Table 5 show that in the mercury free alkaline cells, the average bulge in the cells (Sample Lot 4) containing 1400 parts per million cadmium and 700 parts per million lead in the current collectors was less after eight weeks storage than the average bulge in the cells containing no lead and no cadmium in the current collectors (Sample Lot 1), the cells containing only cadmium in the current collectors (Sample Lot 2), and the cells containing only lead in the current collectors (Sample Lot 3). Thus the addition of cadmium to the lead containing anode current collectors of this invention can further reduce the bulge in mercury free alkaline cells.

EXAMPLE 6

"D" size cells were produced as in Example 1 except that the zinc anode contained no mercury. Again, the variable in each cell was the composition of the zinc alloy anode current collector. The cells were stored at 71° C. and at weekly intervals the net bulge in each cell was measured. The data for an average of three cells per Sample Lot were obtained and ar shown in Table 6.

TABLE 6

| Cells Stored at 71° C. | | | | | | | |
|---|---|---|---|---|---|---|---|
| *Sample Lot 1 | | **Sample Lot 2 | | ***Sample Lot 3 | | ****Sample Lot 4 | |
| Time (weeks) | Bulge (inch) | Time (weeks) | Bulge (inch) | Time (weeks) | Bulge (inch) | Time (weeks) | Bulge (inch) |
| 1 | 0.026 | 1 | 0.005 | 1 | 0.005 | 1 | 0.011 |
| 2 | 0.028 | 2 | 0.004 | 2 | 0.004 | 2 | 0.011 |
| 3 | 0.026 | 3 | 0.004 | 3 | 0.004 | 3 | 0.009 |
| 4 | 0.024 | 4 | 0.004 | 4 | 0.003 | 4 | 0.009 |
| 5 | 0.024 | 5 | 0.003 | 5 | 0.004 | 5 | 0.009 |
| 6 | 0.024 | 6 | 0.004 | 6 | 0.004 | 6 | 0.009 |
| 7 | 0.021 | 7 | 0.003 | 7 | 0.002 | 7 | 0.007 |
| 8 | 0.021 | 8 | 0.004 | 8 | 0.003 | 8 | 0.008 |

*cells had an anode current collector comprising zinc with 700 parts per million lead based on the weight of the current collector dispersed throughout the current collector.
**cells had an anode current collector comprising zinc with 700 parts per million lead based on the weight of the current collector and 400 parts per million indium based on the weight of the current collector dispersed throughout the current collector.
***cells had an anode current collector comprising zinc with 700 parts per million lead based on the weight of the current collector and 100 parts per million indium based on the weight of the current collector dispersed throughout the current collector.
****cells had an anode current collector comprising zinc with 700 parts per million lead based on the weight of the current collector and 40 parts per million indium based on the weight of the current collector dispersed throughout the current collector.

The data in Table 6 show that in mercury free alkaline cells, the average bulge in the cells (Sample Lots 2, 3 and 4) containing indium and lead in the current collectors was smaller than the average bulge in the cells containing only lead (Sample Lot 1) in the current collectors. Thus the addition of indium to the lead-containing anode current collector of this invention can further reduce the bulge in mercury free alkaline cells.

Although specific embodiments of this invention have been described, it should be understood that various modifications may be made without departing from the spirit of this invention.

What is claimed:

1. An electrochemical cell comprising an anode, a cathode, an alkaline electrolyte, and a conductive anode current collector comprising an alloy containing from 60 to 75 weight percent copper, 40 to 25 weight percent zinc and a discontinuous dispersion of lead in which the amount of lead contained in the alloy of the anode current collector is at least 900 parts per million based on the weight of said anode current collector.

2. The electrochemical cell of claim 1 wherein the amount of lead dispersed in the alloy is from 1000 parts per million to 45,000 parts per million based on the weight of said anode current collector.

3. The electrochemical cell of claim 1 wherein the amount of lead dispersed in the alloy is from 2500 parts per million to 30,000 parts per million based on the weight of said anode current collector.

4. The electrochemical cell of claim 1 wherein the anode is zinc.

5. The electrochemical cell of claim 1 wherein the conductive anode current collector is an alloy containing a homogeneous dispersion of lead throughout said alloy.

6. The electrochemical cell of claim 1 wherein the conductive anode current collector alloy containing a dispersion of cadmium in an amount of at least 1000 parts per million based on the weight of said anode current collector.

7. The electrochemical cell of claim 6 wherein the amount of cadmium is from 1500 part million to 2000 parts per million based on the weight of said anode current collector.

8. The electrochemical cell of claim 1 wherein the conductive anode current collector alloy contains a dispersion of indium in an amount of at least 40 parts per million based on the weight of said anode current collector.

9. The electrochemical cell of claim 8 wherein the amount of indium is from 100 parts per million to 500 parts per million based on the weight of said anode current collector.

10. The electrochemical cell of claim 1 wherein the cathode is manganese dioxide and said anode is zinc.

11. The electrochemical cell of claim 10 wherein the alkaline electrolyte is potassium hydroxide.

12. The electrochemical cell of claim 11 wherein said anode contains no mercury.

13. The electrochemical cell of claim 1 wherein the anode is zinc, the cathode is manganese dioxide, the alkaline electrolyte is potassium hydroxide, and the anode current collector comprises from 900 to 45,000 parts per million lead based on the weight of said alloy.

* * * * *